US009026367B2

(12) United States Patent
Paek et al.

(10) Patent No.: US 9,026,367 B2
(45) Date of Patent: May 5, 2015

(54) DYNAMIC DESTINATION NAVIGATION SYSTEM

(75) Inventors: Tim Paek, Sammamish, WA (US);
Paramvir Bahl, Bellevue, WA (US);
Paul N. Bennett, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 13/533,998

(22) Filed: Jun. 27, 2012

(65) Prior Publication Data

US 2014/0005941 A1   Jan. 2, 2014

(51) Int. Cl.
*G01C 21/00* (2006.01)
*G01C 21/34* (2006.01)
*G01C 21/36* (2006.01)
*G08G 1/00* (2006.01)

(52) U.S. Cl.
CPC .......... *G01C 21/3438* (2013.01); *G01C 21/362* (2013.01); *G08G 1/22* (2013.01)

(58) Field of Classification Search
USPC .............. 701/533; 455/456.1, 414.2; 709/219
See application file for complete search history.

(56) References Cited

U.S. PATENT DOCUMENTS

| 7,630,832 | B2 | 12/2009 | Kim et al. | |
|---|---|---|---|---|
| 7,738,087 | B1 | 6/2010 | Saltsman | |
| 7,877,205 | B2 | 1/2011 | Jang et al. | |
| 8,554,243 | B2 * | 10/2013 | Klassen et al. | 455/456.1 |
| 8,774,825 | B2 * | 7/2014 | Forstall et al. | 455/456.1 |
| 2004/0267446 | A1 * | 12/2004 | Minato et al. | 701/209 |
| 2006/0194593 | A1 * | 8/2006 | Drabeck et al. | 455/456.5 |
| 2007/0043502 | A1 * | 2/2007 | Mudalige et al. | 701/207 |
| 2007/0043506 | A1 * | 2/2007 | Mudalige et al. | 701/301 |
| 2008/0146205 | A1 * | 6/2008 | Aaron | 455/414.2 |
| 2009/0079839 | A1 * | 3/2009 | Fischer et al. | 348/218.1 |
| 2009/0143079 | A1 * | 6/2009 | Klassen et al. | 455/456.3 |
| 2009/0234577 | A1 * | 9/2009 | Rinscheid | 701/201 |
| 2010/0039314 | A1 | 2/2010 | Gupta | |
| 2010/0082234 | A1 | 4/2010 | Ohta et al. | |
| 2010/0241346 | A1 * | 9/2010 | Waris | 701/201 |
| 2010/0256852 | A1 * | 10/2010 | Mudalige | 701/24 |
| 2010/0312476 | A1 | 12/2010 | Mueller et al. | |
| 2011/0137552 | A1 | 6/2011 | Chang | |
| 2012/0052870 | A1 * | 3/2012 | Habicher | 455/456.1 |
| 2013/0166157 | A1 * | 6/2013 | Schleicher et al. | 701/50 |

FOREIGN PATENT DOCUMENTS

GB           2473879 A  *  3/2011
WO      WO 2009100701 A1 *  8/2009

OTHER PUBLICATIONS

Fujimori, A., Fujimoto, T., Bohacs, G., "Distributed leader-follower navigation of mobile robots," vol. 2, Publication Year: 2005 , pp: 960-965 vol. 2.*

(Continued)

*Primary Examiner* — Tuan C. To
(74) *Attorney, Agent, or Firm* — Dan Choi; Doug Barker; Micky Minhas

(57) ABSTRACT

The claimed subject matter provides a method for navigating to dynamic destinations. The method includes associating a leader mobile device with a follower mobile device. The method also includes displaying, on the follower mobile device, a first path from a follower vehicle to a first location of a leader vehicle. The follower vehicle is associated with the follower mobile device. The leader vehicle is associated with the leader mobile device. The method further includes displaying, on the follower mobile device, a second path from the follower vehicle to a second location of the leader vehicle.

19 Claims, 10 Drawing Sheets

(56) References Cited

OTHER PUBLICATIONS

Baccou, P., Jouvencel, B., Creuze, V., Rabaud, C., "Cooperative positioning and navigation for multiple AUV operations," vol. 3, Publication Year: 2001, pp. 1816-1821 vol. 3.*

Ghaffarkhah, et al., "Communication-Aware Target Tracking using Navigation Functions", Retrieved at <<http://ieeexplore.ieee.org/stamp/stamp.jsp?tp=&arnumber=4957473>>, ROBOCOMM, Mar. 31, 2009, pp. 1-8.

* cited by examiner

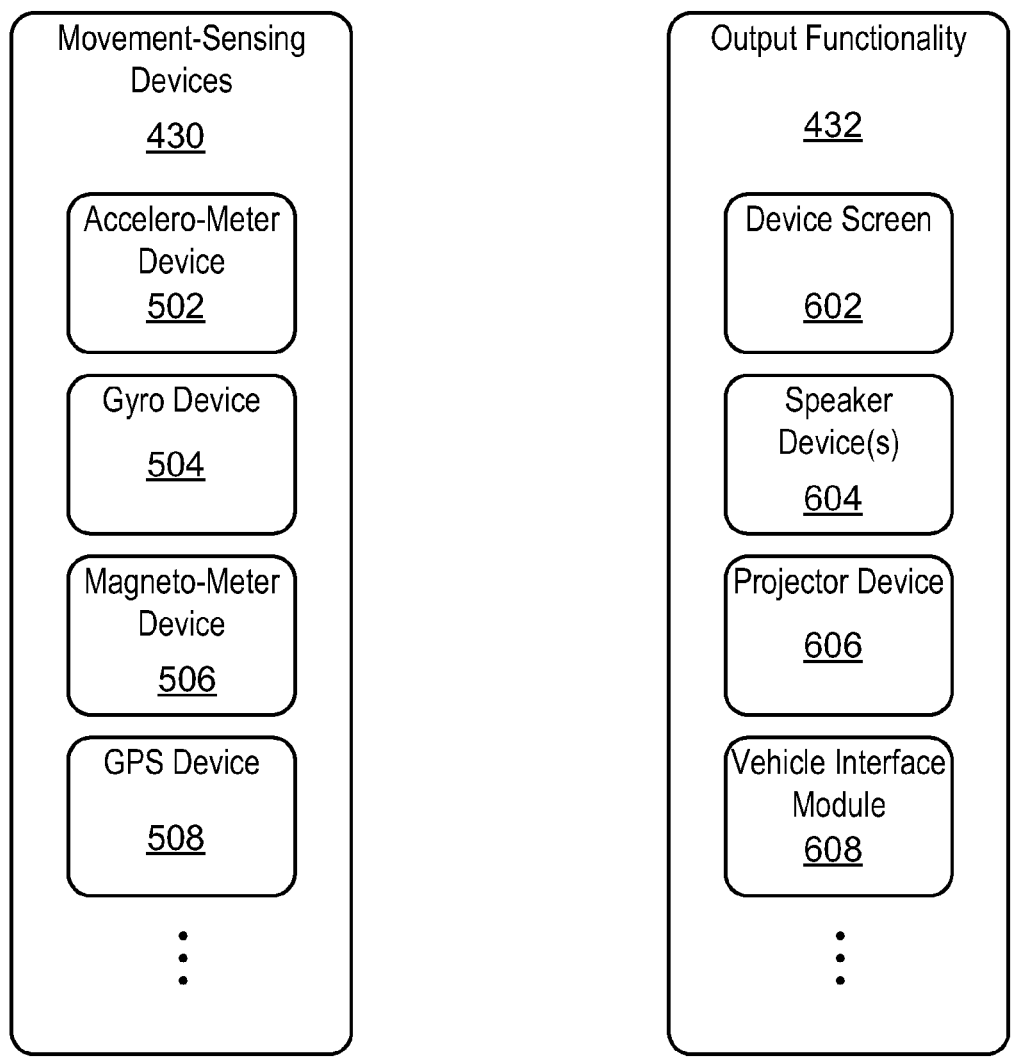

800

900

1000

1100

1200

DYNAMIC DESTINATION NAVIGATION SYSTEM

BACKGROUND

Navigation systems are useful for providing turn-by-turn directions to a specific destination. However, if the specific destination is unknown, these systems are incapable of providing directions. For example, an on-board global positioning system (GPS) may provide directions to a city center, but without a street number address, the GPS is incapable of leading a driver where the driver wants to go. Alternatively, a group of drivers may head to a common destination. If only one of the drivers knows the directions to a favorite beach, for example, the group can still get there by following their leader. However, any follower that loses sight of their leader is likely to get lost.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

A mobile device is described herein that provides a user interface experience to a user who is operating the mobile device while traveling by a vehicle. The mobile device performs this task using dynamic destination navigation functionality. The mobile device includes detachable and non-detachable devices, such as smart phones and navigation head units, respectively.

In one embodiment, the mobile device is docked in a mount in a vehicle. Two or more mobile devices subscribe to a service, such as a caravan service, that shares location information to enable the members of a caravan to follow a leader to an unspecified destination.

The mobile devices display a trail followed by the caravan on a map. The display also includes the current position of the leader, with turn-by-turn directions to the leader's current position. The mobile devices are configured to provide push-to-talk functionality between caravan members. In one scenario, the mode functionality can also infer based on the inference-input information that the vehicle is in a distress condition, e.g., as a result of an accident or other mishap. The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows example movement-sensing devices in accordance with the claimed subject matter;

FIG. 6 shows example output functionality in accordance with the claimed subject matter;

DETAILED DESCRIPTION

Figure 1:
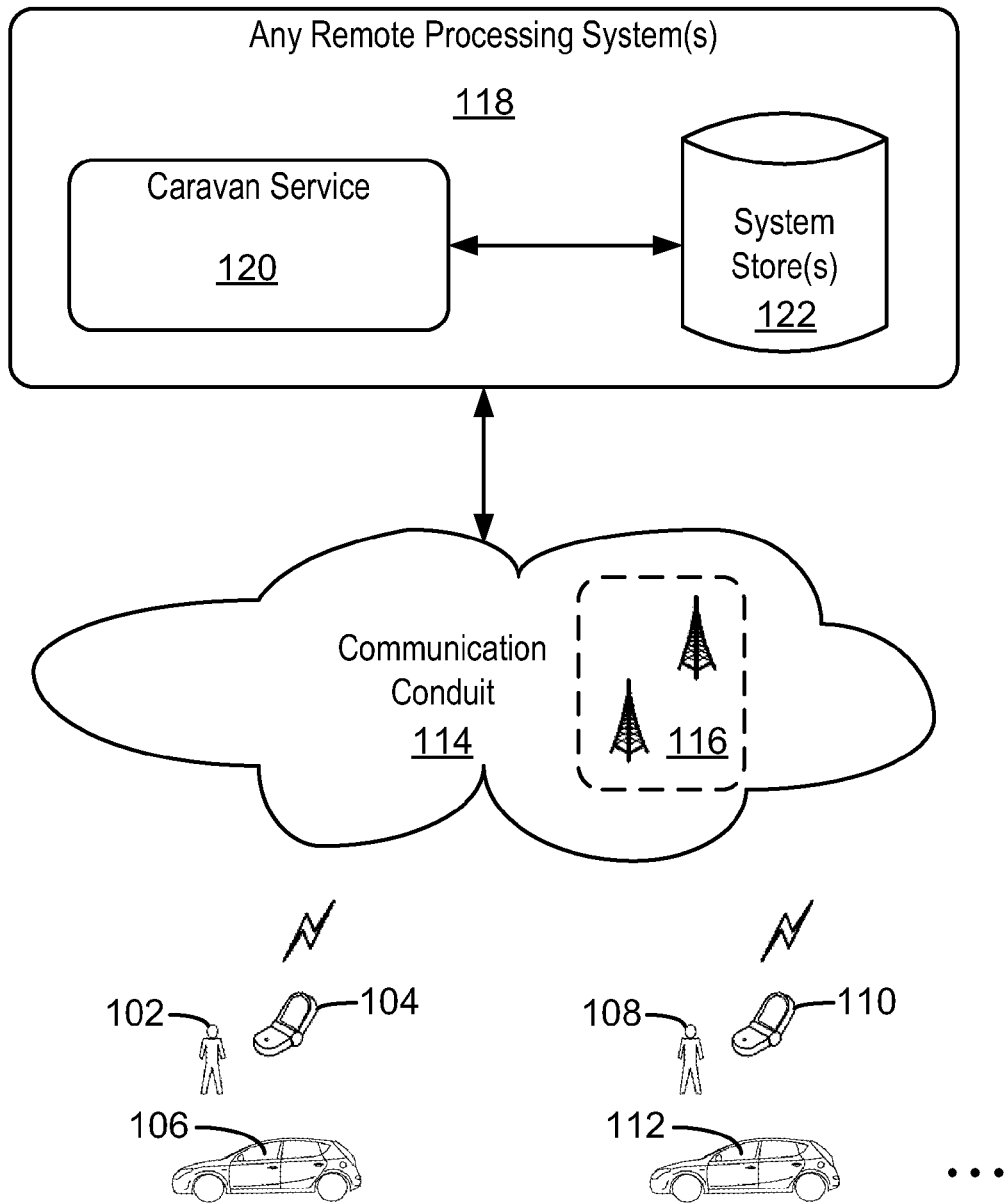
FIG. 1 shows an example environment in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), digital versatile disk (DVD), and others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

An example embodiment provides an interactive experience while traveling by a vehicle that is part of a caravan. The caravan may be a group of vehicles traveling to a common destination. The caravan includes a leader and one or more followers traveling to the same destination. Herein, the term caravan also refers to the mobile devices within the vehicles. Similarly, the leader and followers may be specific devices in the caravan.

Throughout a trip, the followers receive turn-by-turn directions to the current location of the caravan leader's vehicle. Because the leader's vehicle's position is dynamic throughout a trip, the leader's current positions represent a series of dynamic destinations that can be provided to the followers. The membership of the caravan, leaders and followers alike, may also be dynamic, as throughout the trip, various members may leave or enter the caravan. Leaders and followers may also change roles, as is described in greater detail below.

Section A describes illustrative functionality for providing an interactive experience within a vehicle traveling in a caravan. Section B describes illustrative methods that explain the operation of the interactive experience functionality. Section C describes illustrative computing functionality that can be used to implement various aspects of the interactive experience described in Sections A and B.

A. Illustrative Mobile Device and Environment of Use

FIG. 1 shows an illustrative environment 100 for mobile devices operating within vehicles. For example, FIG. 1 depicts an illustrative user 102 who operates a mobile device 104 within a vehicle 106, and a user 108 who operates a mobile device 110 within a vehicle 112. To simplify the explanation, this section will set forth the illustrative composition and manner of operation of the mobile device 104 operated by the user 102 while travelling by vehicle 106, treating this mobile device 104 as representative of any mobile device's operation within the environment 100. In this context, mobile devices 104 include detachable mobile devices, such as a smart phone. Additionally, mobile devices 104 include non-detachable, or installed devices, such as navigation head-units built into an automobile. The vehicles 106 may include automobiles, motorcycles, bikes, boats, off-road vehicles, and so on. The environment 100 can accommodate any number of users, mobile devices, and vehicles. Moreover, in certain cases, this explanation will state that the mobile device 104 performs certain processing functions. This statement is to be construed broadly. In some cases, the mobile device 104 can perform a function by providing logic which executes this function. Alternatively, or in addition, the mobile device 104 can perform a function by interacting with a remote entity, which performs the function on behalf of the mobile device 104.

In an example of the recited subject matter, the mobile device 104 is a general purpose computing device that operates in at least two modes. In a handheld mode of operation, the user 102 can interact with the mobile device 104 while holding it in his or her hands. For example, the user 102 can interact with a touch input device of the mobile device 104 and/or a keypad of the mobile device 104 to perform any device function. In a vehicle mode of operation, the user 102 can interact with the mobile device 104 in his or her vehicle 106. In one embodiment, the interactive experience may depend on whether the mobile device 104 is in vehicle mode. For example, when in vehicle mode, the mobile device 104 may provide interfaces, and selection options relevant to the act of driving, e.g., the interactive experience for traveling in a caravan. Additionally, during vehicle mode, the mobile device 104 may assess the state of the vehicle 106 (i.e., the "vehicle state" according to the terminology used herein) based on inference-input information. In the vehicle state, the mobile device 104 provides an interactive caravan experience as set forth below in greater detail.

By way of overview, the state of the vehicle characterizes the manner in which the vehicle 106 is currently being operated by the user 102. Some aspects of the vehicle state may directly pertain to the dynamics of the vehicle's movement. Such direct aspects can include, but are not limited to: the speed at which the vehicle 106 is traveling; the manner in which the vehicle 106 is being accelerated and decelerated; the manner in which the vehicle 106 is being steered; the manner in which the breaks of the vehicle 106 are being applied, and so on.

Other aspects of the vehicle state may have a more indirect bearing on the manner in which the vehicle 106 is moving. For example, these aspects of the vehicle state may pertain to the qualifying circumstances in which vehicle 106 movement is taking place. Such indirect aspects can include, but are not limited to: the region in which the vehicle 106 is traveling; the time of day in which the vehicle 106 is traveling; the date at which the vehicle 106 is traveling; the weather through which the vehicle 106 is traveling; the road condition over which the vehicle 106 is traveling, and so forth.

The mobile device 104 can determine the vehicle state based on inference-input information. The inference-input information pertains to any information that can be used to infer the vehicle state. Some of the inference-input information may originate from input sources which are internal to the mobile device 104. Other inference-input information may originate from input sources which are external to the mobile device 104.

Generally, a user interface experience refers to the manner in which a user 102 interacts with the mobile device 104, either by providing user-input information to the mobile device 104 or receiving output information from the mobile device 104. More specifically, the manner in which the user 102 provides user-input information to the mobile device 104 is defined by various input modes that a user 102 can use to provide the user-input information to the mobile device 104. Illustrative input modes can include a keypad input mode, a touch screen input mode, a voice-recognition input mode, a gesture-recognition input mode, and so on (to be described in greater detail below). The manner in which the mobile device 104 provides output information to the user is defined by various output modes. Illustrative output modes can include a display output mode, a speech output mode, and so on (to be described in greater detail below). The mobile device 104 can vary the user interface experience by activating and/or deactivating certain input modes and/or output modes. Alternatively, or in addition, the mobile device 104 can vary the user interface experience by changing the manner of operation of any input mode and/or any output mode (again, to be described in greater detail below).

By way of overview, the system enables two or more mobile devices 104 to form a caravan for travelling together. In a caravan, one mobile device 104 may be designated as the leader, and the remaining members, followers. The terms member and member devices are used interchangeably herein. Similarly, this is so for leader and leader devices. The followers receive turn-by-turn directions to the leader vehicle's position. The directions are updated dynamically as the leader and follower vehicles' positions change during a trip. The directions may be based on either the path taken by the leader vehicle, or a shorter, intercept path.

Additionally, the system 100 may enable keeping the caravan together, in spite of various pit stops, or somebody getting lost, along the way. In one embodiment, when a member of the caravan appears to have dropped off the caravan's trail, the leader is notified. In this way, action may be taken to keep all caravan members in relatively close proximity. For example, the leader device may initiate a call to the follower if the follower vehicle appears to be leaving the caravan.

Given the above overview, the description will now advance to a more detailed description of the individual features depicted in FIG. 1. Starting with the mobile device 104 itself, this apparatus can be implemented in any manner and can perform any function or combination of functions. For example, the mobile device 104 can correspond to a mobile telephone device of any type (such as a smart phone), dedicated devices, such as a global positioning system (GPS) device and a book reader, a personal digital assistant (PDA), a laptop, a tablet, a netbook, game devices, portable media systems, interface modules, and so on. It is noted that a GPS device may be additionally supported by access points to enable the sharing of location information between the mobile devices 104.

The vehicle 106 can correspond to any mechanism for transporting the user 102. For example, the vehicle 106 may correspond to an automobile of any type, a truck, a bus, a motorcycle, a scooter, a bicycle, an airplane, a boat, and so on. However, to facilitate explanation, an example vehicle 106 corresponds to a personal automobile operated by the user 102.

The environment 100 also includes a communication conduit 114 for allowing the mobile device 104 to interact with any remote entity (where a "remote entity" means an entity that is remote with respect to the user 102). For example, the communication conduit 114 may allow the user 102 to use the mobile device 104 to interact with another user who is using another mobile device (such as the user 108 who is using the mobile device 110). In addition, the communication conduit 114 may allow the user 102 to interact with any remote services. Generally speaking, the communication conduit 114 can represent a local area network, a wide area network (e.g., the Internet), or any combination thereof. The communication conduit 114 can be governed by any protocol or combination of protocols.

More specifically, the communication conduit 114 can include wireless communication infrastructure 116 as part thereof. The wireless communication infrastructure 116 represents the functionality that enables the mobile device 104 to communicate with remote entities via wireless communication. The wireless communication infrastructure 116 can encompass any of cell towers, base stations, central switching stations, satellite functionality, short-range wireless networks, and so on. The communication conduit 114 can also include hardwired links, routers, gateway functionality, name servers, etc.

The environment 100 also includes one or more remote processing systems 118. The remote processing systems 118 provides services to the users. In one case, each of the remote processing systems 118 can be implemented using one or more servers and associated data stores. For instance, FIG. 1 shows that the remote processing systems 118 can include at least one instance of a caravan service 120 and an associated system store 122. The associated system store 122 may include basic data accessible from the mobile device 104 that can be leveraged in a vehicle context, and other scenarios. The data may include information about the vehicle state, user preferences, traffic conditions, and the location of the vehicles 106. The vehicle state information may include the number of passengers, OBDII data such as oil and fuel levels, temperature, and more. User preference information may include purchasing history, places a user has visited, places a user has contacted, as well as user preferences for specific domains such as music, audio books, points of interest (POI) for tourism, etc. The user preference data may be used to select ads for presentation on the mobile device. The traffic data may include data from online sources, traffic cameras, traffic around the mobile device 104, including stoplights and vehicle brake lights. The traffic data may also include crowdsourced information about traffic conditions. The ensuing description will set forth illustrative functions that the caravan service 120 can perform that are germane to the operation of the mobile devices 104 within the vehicles 106.

Figure 2:
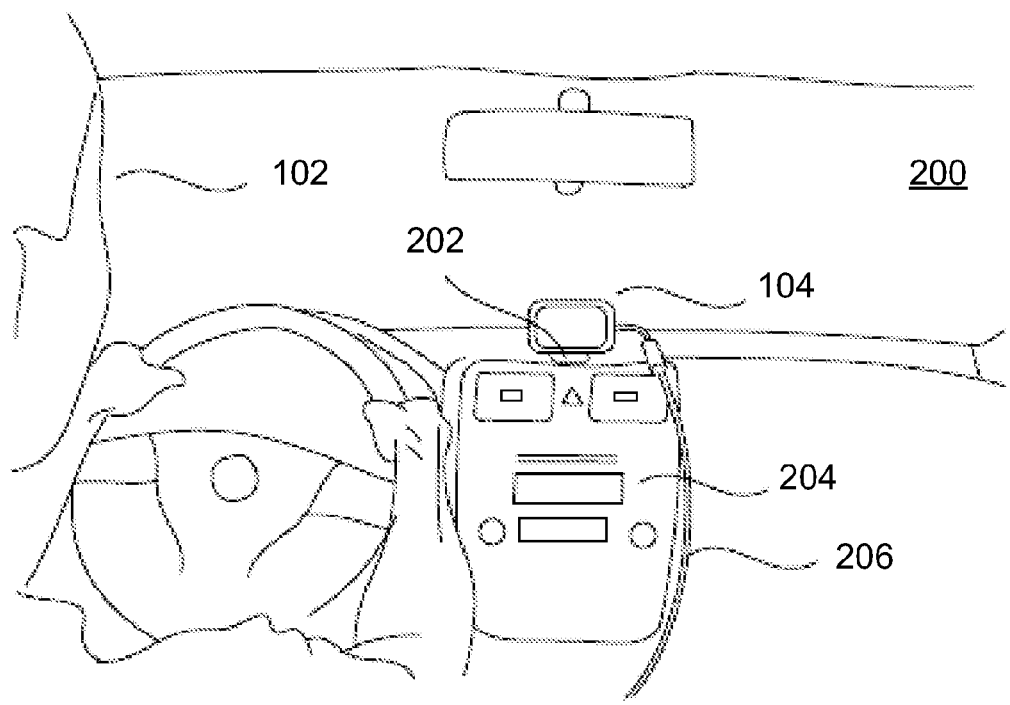
FIG. 2 depicts an interior region of a vehicle in accordance with the claimed subject matter.

FIG. 2 shows a portion of a representative interior region 200 of a vehicle 106. A mount 202 secures the mobile device 104 within the interior region 200. More specifically, the mount 202 secures the mobile device 104 to the top of the vehicle's dashboard, to the right of the user 102, just above the vehicle control panel region 204. A power cord 206 supplies power from any power source provided by the vehicle 106 to the mobile device 104 (either directly or indirectly, as will be described with respect to FIG. 7.

The mobile device 104 can include at least one internal camera device (not shown in FIG. 2) having a field of view that projects out from a face of the mobile device 104, towards the user 102. More specifically, the user 102 can place the mobile device 104 within the interior region 200 in such a manner that the field of view of the camera device encompasses at least a part of the anatomy of the user 102. In one implementation, this placement enables the internal camera device to establish an interaction space. The internal camera device can capture gestures made by the user 102 within that interaction space. In one illustrative implementation, the interaction space may generally correspond to a conic volume that extends approximately 60 cm from the face of the mobile device 104, pointed towards the user 102 who is driving the vehicle 106 (although different end-use environments can adopt interaction spaces having different "sizes" and shapes).

However, the placement of the mobile device 104 shown in FIG. 2 is merely representative, meaning that the user 102 can choose other locations and orientations of the mobile device 104. For example, the user 102 can place the mobile device 104 in a left region with respect to the steering wheel, instead of a right region with respect to the steering wheel (as shown in FIG. 2). This might be appropriate, for example, in countries in which the steering wheel is provided on the right side of the vehicle 106. Alternatively, the user 102 can place the mobile device 104 directly behind the steering wheel or on the steering wheel. Alternatively, the user 102 can secure the mobile device 104 to the windshield of the vehicle 106. These possible placements are mentioned by way of illustration, not limitation. Still other placements of the mobile device 104 are possible.

Figure 3:
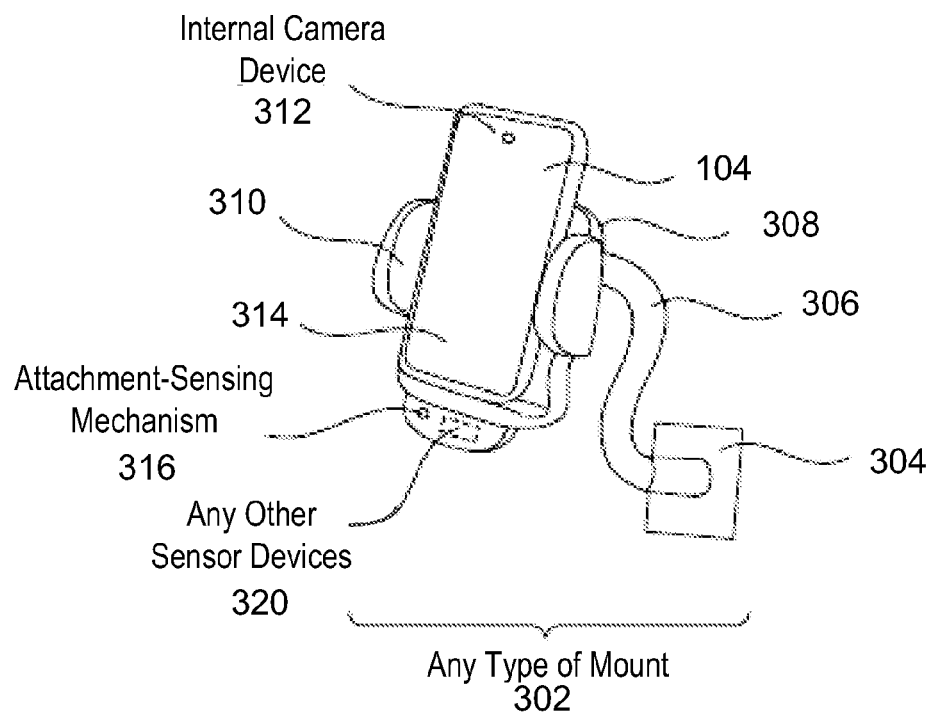
FIG. 3 shows an example mount within a vehicle.

FIG. 3 shows a mount 302 that can be used to secure the mobile device 104 to some surface of the interior region 200. Note that this mount 302 is a different type of mount than the mount 202 shown in FIG. 2. Without limitation, the mount 302 of FIG. 3 includes any type of coupling mechanism 304 for fastening the mount 302 to a surface within the interior region 200. For instance, the coupling mechanism 304 can include a clamp or protruding member (not shown) that attaches to an air movement grill of the vehicle 106. In other cases, the coupling mechanism 304 can include a plate or other type of member which can be fastened to any surface of the vehicle 106 using any type of fastener (e.g., screws, clamps, a Velcro coupling mechanism, a sliding coupling mechanism, a snapping coupling mechanism, a suction cup coupling mechanism, etc.).

In still other cases, the mount 302 can merely sit on a generally horizontal surface of the interior region 200, such as on the top of the dashboard, without being fastened to that surface. To reduce the risk of this type of mount sliding on the surface during movement of the vehicle 106, it can include a weighted member, such as a sand-filled malleable base member.

In one merely illustrative implementation, the representative mount 302 shown in FIG. 3 includes a flexible arm 306 which extends from the coupling mechanism 304 and terminates in a cradle 308. The cradle 308 can include an adjustable clamp mechanism 310 for securing the mobile device 104 to the cradle 308. In this particular scenario, the user 102 has attached the mobile device 104 to the cradle 308 so that it can be operated in a portrait mode. But the user 102 can alternatively attach the mobile device 104 so that it can be operated in a landscape mode (as shown in FIG. 2).

As mentioned above, the mobile device 104 includes at least one internal camera device 312 which projects out from a front face 314 of the mobile device 104 (or other face of the mobile device 104). The internal camera device 312 is identified as "internal" insofar as it is typically considered an integral part of the mobile device 104. In addition, the mobile device 104 can receive image information from one or more external camera devices (not shown).

Further, the mount 302 may incorporate any attachment-sensing mechanism 316 for determining when the mobile device 104 has been inserted in the cradle 308 of the mount 302. For example, the attachment-sensing mechanism 316 can comprise a mechanical switch that that is toggled from an OFF to an ON state when the user 102 inserts the mobile device 104 into the cradle 308, and from an ON to OFF state when the mobile device 104 becomes dislodged from the cradle 308. Other implementations of the attachment-sensing device include a light-sensing switch, a pressure-sensing switch, and so on. Alternatively, or in addition, the mobile device 104 can implement an attachment sensing mechanism (not shown). That is, in complementary fashion, a device-implemented attachment sensing mechanism is configured to be activated when the user 102 places the mobile device 104 in the cradle 308. Alternatively, or in addition, the mobile device 104 can infer the fact that it has become dislodged from the cradle 308 based on indirect evidence.

Further, the mount 302 can include one or more supplemental sensor devices 320 (depicted generically in FIG. 3 by a dashed box). For example, the sensor devices 320 can encompass one or more of the types of movement-sensing devices 430 shown in FIG. 5 (to be described below). In addition, the mount 302 can encompass additional image-sensing mechanisms, such as one or more additional camera devices of any type, etc.

Figure 4:
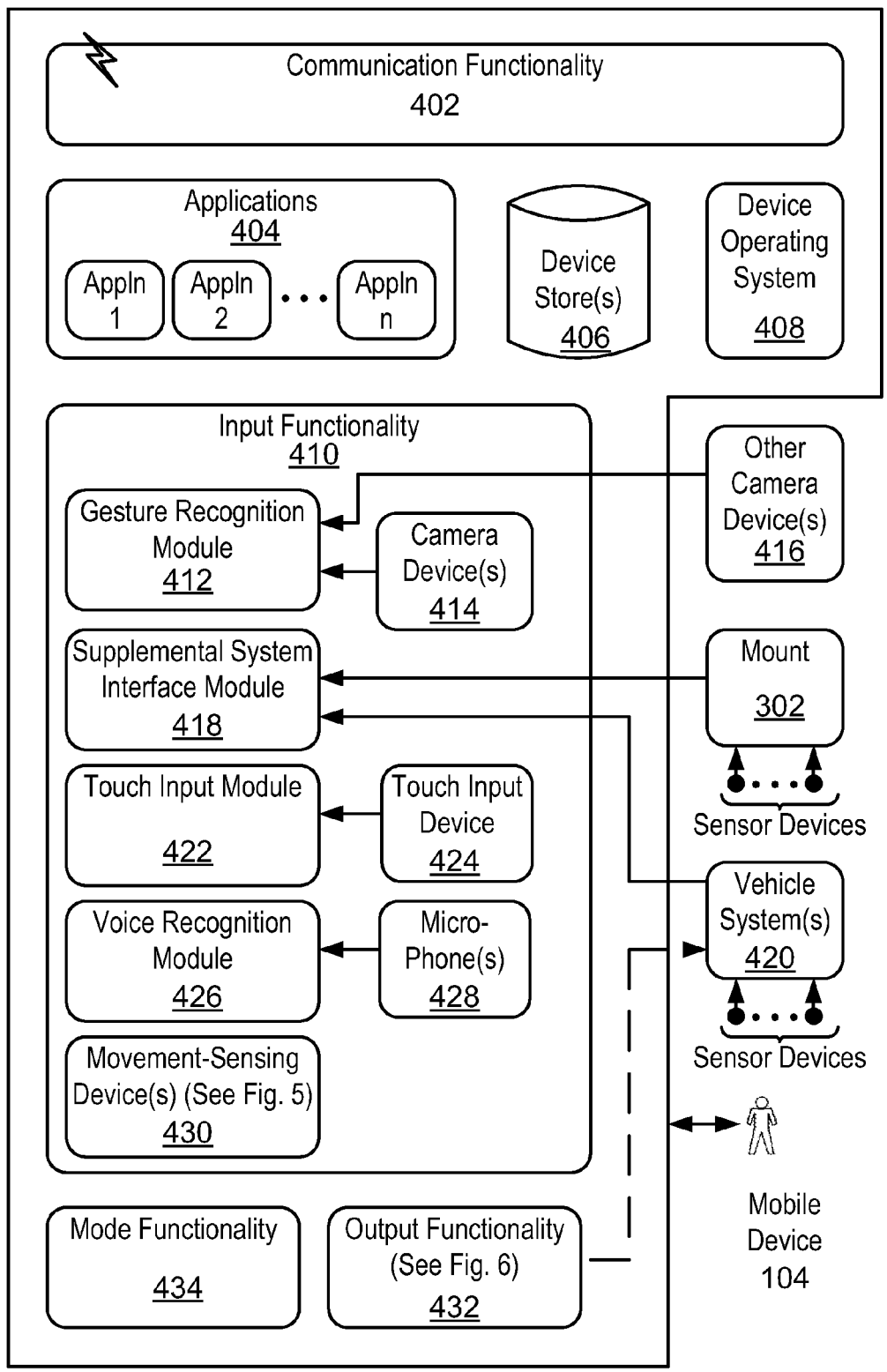
FIG. 4 shows an example mobile device in accordance with the claimed subject matter.

FIG. 4 shows various components that can be used to implement the mobile device 104. This figure is generally described from top-to-bottom as represented. The mobile device 104 includes communication functionality 402 for receiving and transmitting information to remote entities via wireless communication. That is, the communication functionality 402 may comprise a transceiver that allows the mobile device 104 to interact with the wireless communication infrastructure 116 of the communication conduit 114.

The mobile device 104 can also include a set of one or more applications 404. The applications 404 represent any type of functionality for performing any respective tasks. In some cases, the applications 404 perform high-level tasks. To cite representative examples, a first application may perform a dynamic location navigation task, a second application can perform a media presentation task, a third application can perform a communication task, and so on. In other cases, the applications 404 perform lower-level management or support tasks. The applications 404 can be implemented in any manner, such as by executable code, script content, etc., or any combination thereof. In one embodiment, such applications 404 may be purchased through, for example, an online marketplace for mobile device applications. In other implementations, at least parts of the applications 404 can be implemented by the remote processing systems 118. For example, in certain implementations, some of the applications 404 may represent network-accessible documents or functionality. The mobile device 104 can also include at least one device store 406 for storing any application-related information, as well as other information. For example, the device store 406 may store device-specific, e.g., user, preferences for dynamic location navigation. Such preferences may include preferences for display parameters, e.g. ad displays, parameters for dynamic location navigation decisions, and so on.

Dynamic location navigation decisions may include application-specific information, such as, information that an application 404 uses to support its functionality. An example application may maintain the membership of the caravan, and as such, decides whether each member of a caravan stays with the group throughout the trip. User preferences may specify certain parameters, such as factors affecting the relative location of all members of the caravan. For example, a user may specify that a vehicle is no longer in the caravan because the vehicle is not following directions to the leader vehicle's current location. Alternatively, a member's vehicle that is more than 10 blocks from the leader's vehicle may no longer be in the caravan. Another preference may remove the device 104, or vehicle 106 from membership if the vehicle 106 stops moving for more than 2 minutes. In this way, the user preferences may allow for contingencies, such as traffic or an accident.

The mobile device 104 can also include a device operating system 408. The device operating system 408 provides functionality for performing low-level device management tasks. Any application can rely on the device operating system 408 to utilize various resources provided by the mobile device 104. The mobile device 104 can also include input functionality 410 for receiving and processing input information. Generally, the input functionality 410 includes some functionality for receiving input information from internal input devices (which represent components that are part of the mobile device 104 itself), and some functionality for receiving input information from external input devices. The input functionality 410 can receive input information from external input devices using any coupling technique or combination of coupling techniques, such as hardwired connections, wireless connections (e.g., Bluetooth® connections), and so on.

The input information that is used to infer the state of the vehicle 106 is referenced to herein as inference-input information. This input information that is provided by the user 102 is referenced to herein as user-input information. These two classes of input information are not mutually exclusive. Some of the information that is input by a user 102 may constitute inference-input information. A generic reference to "input information," without the qualifier "user" or "inference," refers to any type of input information.

The input functionality 410 may include a gesture recognition module 412 for receiving image information from at least one internal camera device 414, and/or from at least one external camera device 416. For example, the external camera device 416 can be associated with the mount 302, or by some other unit within the vehicle 106. Any of these camera devices can provide any type of image information. For example, in one case, a camera device can provide video image information, produced by receiving visible-spectrum radiation, infrared-spectrum radiation, etc., or combination thereof. In another case, a camera device can provide image information that can be further processed to provide depth information. Depth information provides an indication of the distances between different points in a captured scene and a reference point, e.g., corresponding to the location of the camera device. Depth processing functionality can generate depth information using any technique, such as a time-of-flight technique, a structured light technique, a stereoscopic technique, and so on. After receiving the image information, the gesture recognition module 412 can determine whether the image information reveals that the user 102 has made a recognizable gesture.

The input functionality 410 can also receive image information from one or more camera devices that capture a scene that is external to the vehicle 106. For example, an internal or external camera device can capture a scene in front of the vehicle 106, in back of the vehicle 106, to either side, etc. These camera devices can also be used in conjunction with any type depth processing functionality described above. The use of depth processing functionality allows the mobile device 104 to assess the distance between the vehicle 106 and other nearby vehicles and obstacles. The input functionality 410 can also receive inference-input information from any other type of distance sensing mechanism, such as a Light Detection And Ranging (LIDAR) sensing device, etc.

The input functionality 410 can also include a supplemental system interface module 418. The supplemental system interface module 418 receives inference-input information from any vehicle system 420, and/or from the mount 302, and/or from any other external system. For example, the supplemental system interface module 418 can receive any type of on-board information provided by the vehicle's information management system. Such information can describe the operating state of the vehicle 106 at a particular point in time, such as by providing information regarding the vehicle's speed, steering state, breaking state, engine temperature, engine performance, odometer reading, oil level, fuel level, the presence of passengers in the vehicle 106, and so on. To provide this information, the vehicle system 420 can receive sensor information from a plurality of sensing devices provided by the vehicle 106. Alternatively, or in addition, the supplemental system interface module 318 can receive inference-input information collected by one or more sensor devices, such as, one or more supplemental accelerometer devices provided by the mount 302.

The input functionality 410 may also include a touch input module 422 for receiving user-input information when a user 102 touches a touch input device 424. Although not depicted in FIG. 4, the input functionality 410 can also include any type of physical keypad input mechanism, any type of joystick control mechanism, any type of mouse device mechanism, and so on. The input functionality 410 can also include a voice recognition module 426 for receiving voice commands from one or more microphone devices 428.

The input functionality 410 can also include one or more movement-sensing devices 430. Generally, the movement-sensing devices 430 determine the manner in which the mobile device 104 is being moved at any given time. That information, in turn, can pertain to either the dynamic movement of the mobile device 104 and/or its position at any given time. Advancing momentarily to FIG. 5, this figure indicates that the movement-sensing devices 430 can include any of an accelerometer device 502, a gyro device 504, a magnetometer device 506, a GPS device 508 (or other satellite-based position-determining mechanism), a dead-reckoning position-determining device (not shown), a cell tower or WiFi triangulation device (not shown), and so on. Further, the movement-sensing device 430 can include any type of vision device described above, e.g., corresponding to one or more camera devices and associated functionality. That is, the images captured by the vision device comprise evidence regarding the movement of the vehicle 106, 112; therefore, the vision device can be considered as a type of movement-sensing device. This set of possible devices is representative, rather than exhaustive. In other cases, another entity besides, or in addition to, the mobile device 104 can assess the movement of the mobile device 104, such as any functionality provided by the remote processing systems 118.

Referring back to FIG. 4, the mobile device 104 also includes output functionality 432 for conveying information to a user 102 in an output presentation. Advancing momentarily to FIG. 6, this figure indicates that the output functionality 432 can include any of a device screen 602, one or more speaker devices 604, a projector device 606 for projecting output information onto any surface, and so on.

The output functionality 432 also includes a vehicle interface module 608 that enables the mobile device 104 to send output information to any vehicle system 420 associated with the vehicle 106. This allows the user 102 to interact with the mobile device 104 to control the operation of any functionality associated with the vehicle 106 itself. For example, the user 102 can interact with the mobile device 104 to control the playback of media content on a separate vehicle media system. The user 102 may prefer to directly interact with the mobile device 104 rather than the systems of the vehicle 106 because the user 102 is presumably already familiar with the manner in which the mobile device 104 operates. Moreover, the mobile device 104 has access to a remote system store 122 which can provide user-specific information. The mobile device 104 can leverage this information to control any vehicle system 420 in a manner that is customized for a particular user 102.

Referring back to FIG. 4, the mobile device 104 may also include mode functionality 434. The mode functionality 434 performs the functions summarized above, which include assessing the state of the vehicle 106 at a particular point in time and providing an interactive experience that takes into consideration the vehicle state. At least parts of the mode functionality 434 can be implemented by the remote processing systems 118.

Figure 7:
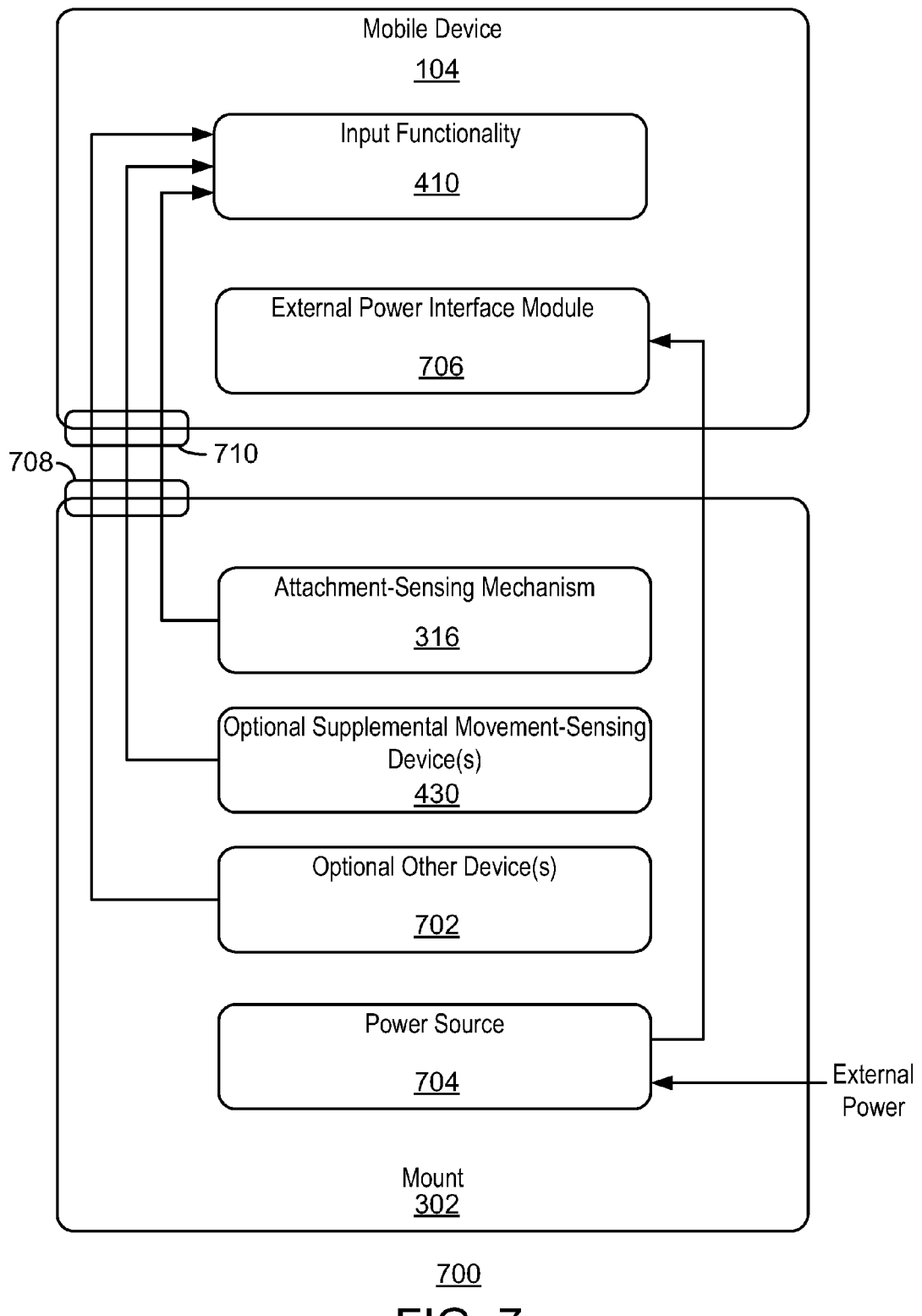
FIG. 7 shows example functionality associated with the mount in accordance with the claimed subject matter.

FIG. 7 illustrates one manner in which the functionality provided by the mount 302 can interact with the mobile device 104. The mount 302 can include interface 708, connected to interface 710 of the mobile device 104. The interfaces 708, 710 allow the input functionality 410 of the mobile device 104 to communicate with the components of the mount 302.

The mount also includes an attachment sensing mechanism 316, which provides an attachment signal to the input functionality 410 of the mobile device 104. The attachment signal indicates whether or not the mobile device 104 is presently coupled to the mount 302. The mount 302 can also include any of the type of the movement-sensing devices 430 shown in FIG. 5 for providing inference-input information to the input functionality 410 of the mobile device 104. The mount 302 can also include other devices 702 for providing inference-input information to the input functionality 410 of the mobile device 104. Alternatively, or in addition, the devices 702 can perform various processing functions, and can then send the results of such processing to the mobile device 104.

The mount 302 can also include a power source 704 which feeds power to the mobile device 104, e.g., via an external power interface module 706 provided by the mobile device 104. The power source 704 may, in turn, receive power from any external source, such as a power source (not shown) associated with the vehicle 106. In this implementation, the power source 704 powers both the components of the mount 302 and the mobile device 104. Alternatively, each of the mobile device 104, and the mount 302 can be supplied with separate sources of power.

Figure 8:
FIG. 8 shows an example output mode in accordance with the claimed subject matter.
Figure 9:
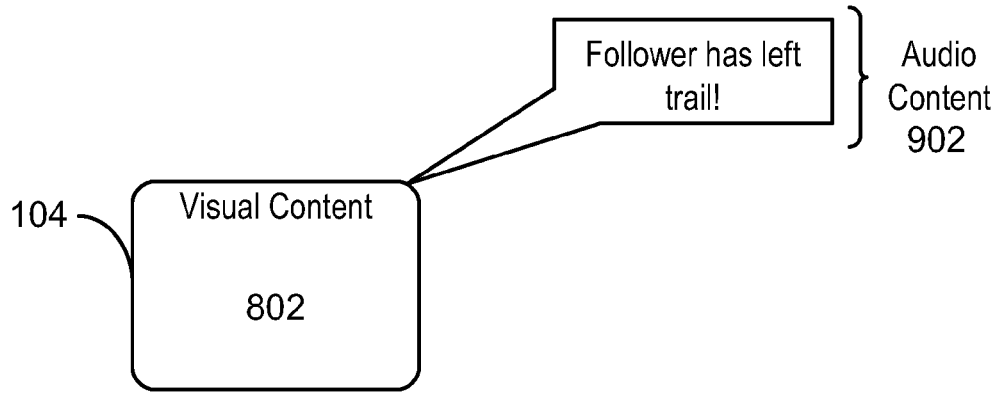
FIG. 9 shows an example output mode in accordance with the claimed subject matter.

FIGS. 8 and 9 pictorially summarize two output modes. That is, in FIG. 8, the mobile device 104 presents visual content on the display screen 602 of the mobile device 104. For example, if a follower leaves the trail the caravan is following, a message 602 may be displayed, e.g., "Follower A has left the trail." In FIG. 9 the mobile device 104, presents audio content that supplements or replaces the visual content 802. For example, the message 902 may be announced over the speaker device 604.

Figure 10:
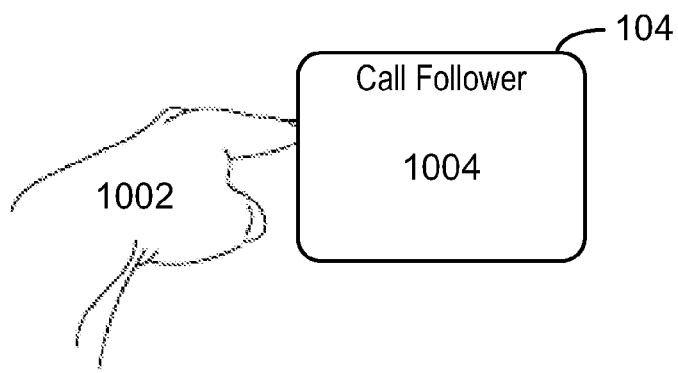
FIGS. 10-12 show three example input modes in accordance with the claimed subject matter.
Figure 11:
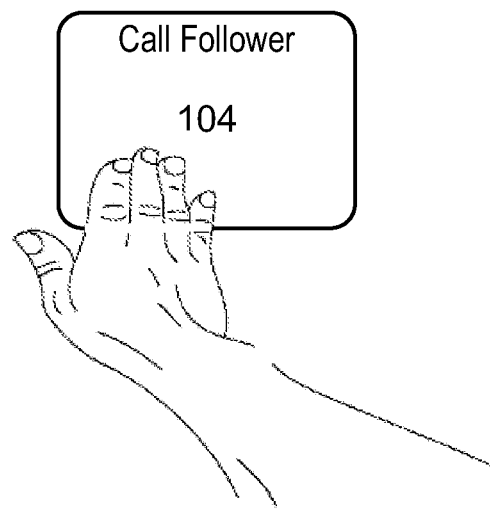
Figure 12:
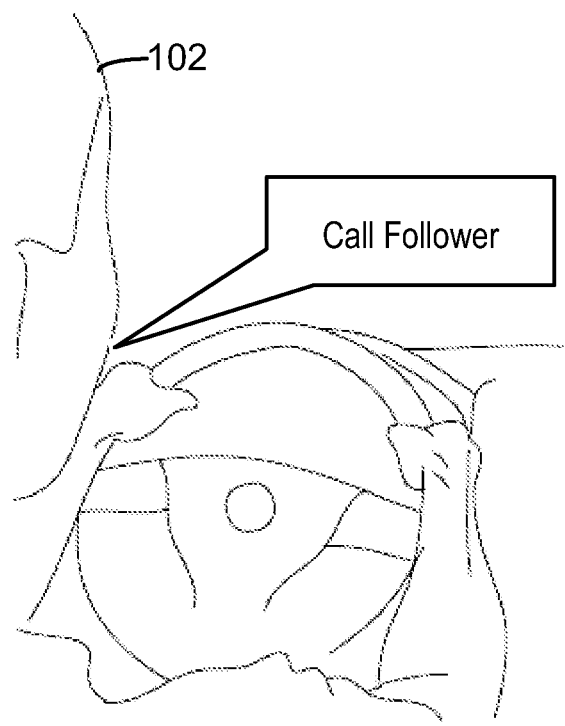

FIGS. 10-12 pictorially summarize three input modes. That is, in FIG. 10, the touch input module 422 accepts user-input information when the user 102 uses a hand 1002 to touch an icon 1004 or other object presented on a touch input screen of the mobile device 104. For example, the icon 1004 may provide push-to-talk functionality between the leader and the followers. In FIG. 11, the gesture recognition module 412 receives user-input information when the user 102 makes a gesture that is captured by the internal camera device 414 of the mobile device 104, without touching the mobile device 104. The gesture recognition module 412 can recognize this gesture by comparing the captured image information with candidate gesture information associated with each of a set of possible candidate gestures. In this example, the leader may call Follower A with an appropriate gesture. In FIG. 12, the voice recognition module 426 receives user-input information when the user 102 annunciates a voice command. In this example, the leader may announce, "Call Follower A," to initiate a call to Follower A. In one embodiment, the mobile devices 104 for both the leader and the followers may enable communication between any or all members of the caravan.

B. Illustrative Processes

Figure 13:
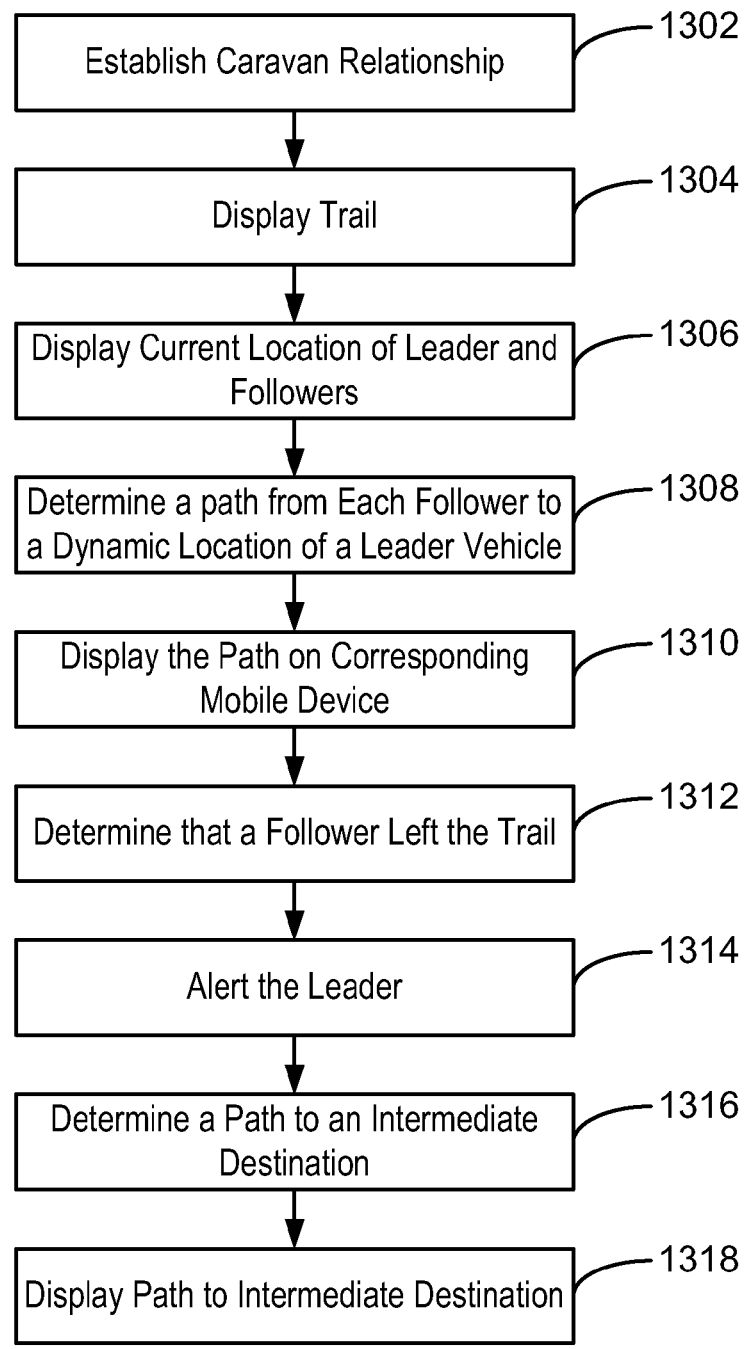
FIG. 13 shows a process flow chart for a method in accordance with the claimed subject matter.

FIG. 13 shows a process flow chart for a method in accordance with the claimed subject matter. The method begins at block 1302, where at least two mobile devices 104 establish a caravan relationship. Two or more mobile devices 104 first establish a connection indicating that they wish to share location information with each other. In one embodiment, all member devices of a caravan subscribe to the caravan service 120, which monitors the GPS locations of the mobile devices 104. One mobile device 104 is tagged as the "leader." Accordingly, the other devices 104 are tagged as "followers." During a trip, the leader's device may continuously share its location with the followers' devices.

At block 1304, a trail may be displayed on the mobile devices 104. The trail represents a path on a map from a departure location of the leader vehicle and a current location of the leader vehicle. At block 1306, the current location of the leader and followers may be displayed on the mobile devices 104. In one embodiment, the location of all members of the caravan may be displayed on the mobile devices 104.

At block 1308, a path from each follower to a current location of the leader is determined. The followers' mobile devices may request directions from the caravan service 120 to the leader device's current location. The path may include turn-by-turn directions. In one embodiment, the path may represent a path the leader followed to the leader's current location.

Alternatively, if the caravan service 120 detects that the follower can reach the leader in a shorter path than the leader has taken, the service 120 may also provide directions for the shorter path. In one embodiment, the shorter path can be identified by continuously computing the path to the dynamically changing destination of the leader. The route computation can be performed in the cloud or on the mobile device 104. The service 120 maintains a cloud presence to provide location sharing between caravan devices.

At block 1310, the path for each follower vehicle is displayed on a corresponding mobile device 104. The path may be displayed separately from the trail and current locations of the vehicles 106. In one embodiment, the user 102 may specify a preference for displaying the leader's path, a shortest path, or both. Advantageously, as the leader device dynamically changes location, the service 120 relays continuously updated navigation directions to the follower devices. That way, even if the leader exits the follower's visual field, the follower device can still stay on the trail, following the leader.

At block 1312, it may be determined that a follower has left the trail. The parameters for determining whether the follower has left may be specified in user preferences on the leader's mobile device 104. Parameters may include, for example, a follower that deviates from the path of the leader, a follower that is stopped for more than two minutes, or is otherwise not following directions to the leader. At block 1314, the device 104 alerts the leader. The alert may be a message displayed or otherwise presented on the leader's mobile device that specifies the exiting follower and provides selectable functionality for communication with that follower. For example, the leader's mobile device 104 may provide a selection icon to call the exiting follower's mobile device 104. The exiting follower may also receive an alert, and be provided selectable functionality to contact the leader or other followers. In one embodiment, the caravan service 120 makes the determination and may send the alert.

At block 1316, the caravan service 120 may determine a path to an intermediate destination in response to a user selection from one of the mobile devices 104. During a road trip, it is common to stop for a bite. In one embodiment, the leader selects a restaurant from a user interface on the mobile device 104. In response, the caravan service 120 determines which caravan members can get to the restaurant faster if they do not follow the leader vehicle. In this way, the caravan service 120 may provide directions directly to the selected restaurant instead of directions to follow the leader vehicle. At block 1318, the mobile device 104 displays the path to the intermediate destination. The blocks 1304-1318 may be repeated continuously until all the caravan members arrive at the final destination.

During a trip, the caravan may encounter a scenario where the leader vehicle is no longer capable of leading the caravan. The leader vehicle may break down, or become bogged down in traffic. The passing of leadership may also be configurable when multiple caravan members know how to reach the destination. This increases reliability when the original leader may experience a communication failure to update the other vehicles. In such a scenario, another vehicle may take over the role of the leader vehicle. Accordingly, the leader device functionality may be transferred to a new leader device.

Figure 14:
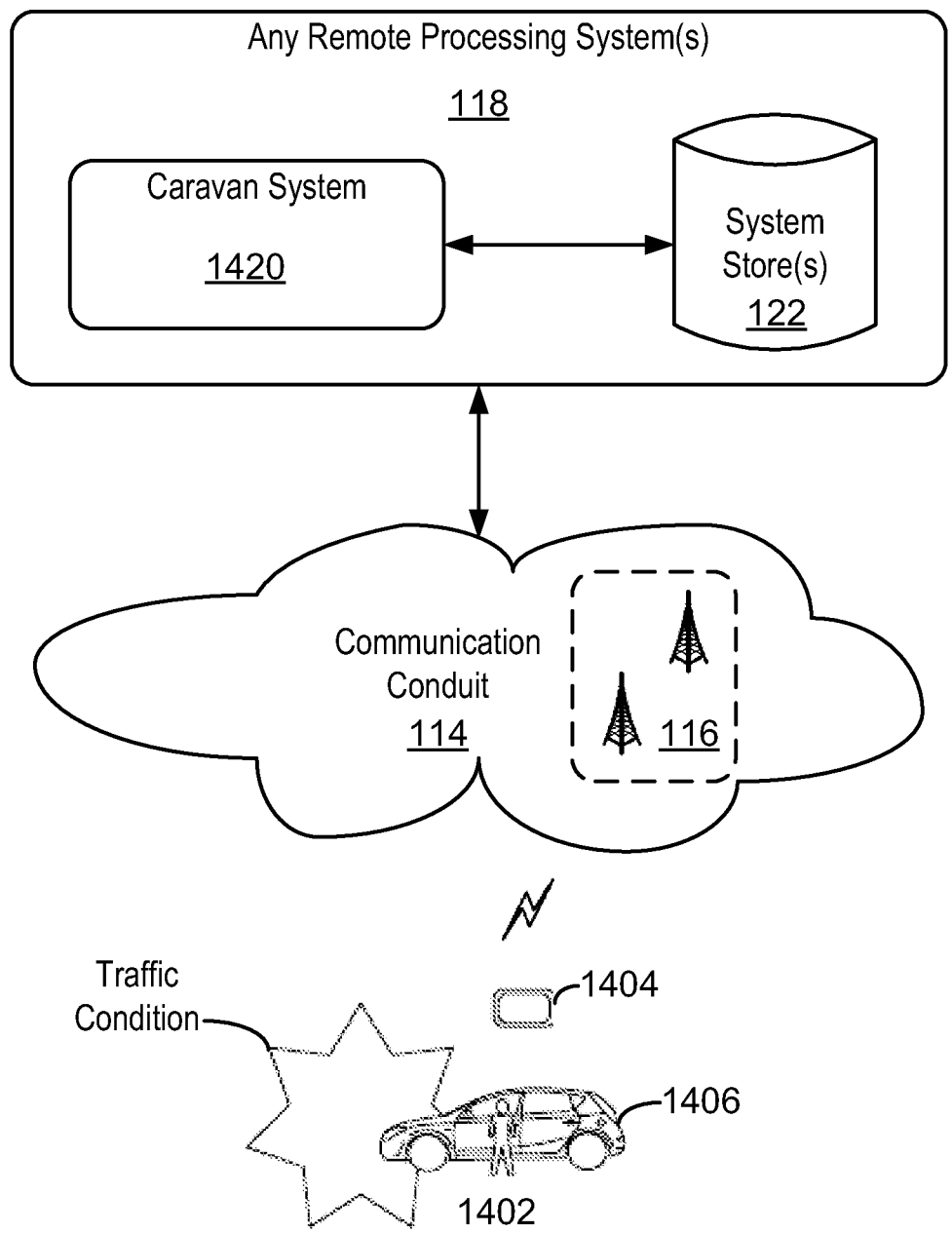
FIG. 14 shows an example environment in which functionality can infer and respond to a traffic condition in accordance with the claimed subject matter.

FIG. 14 shows an example environment in which functionality can infer and respond to a traffic condition in accordance with the claimed subject matter. The example environment 1400 shows the leader 1402, with leader device 1404, in leader vehicle 1406, stopped by a traffic condition. In one embodiment, inference-input information may be used to automatically detect bad traffic conditions, such as congestion, accidents, etc. In such an embodiment, the leader device 1404 may present an interface for the leader 1402 to select a new leader vehicle (not shown). The interface may include the trail with all caravan member locations displayed. The leader may select a new leader vehicle (not shown) from the display, and call the new leader with directions to a rendezvous, or the final destination. The other caravan members may then be provided turn-by-turn directions to the new leader vehicle. In this scenario, the former leader may become a follower.

C. Representative Computing Functionality

Figure 15:
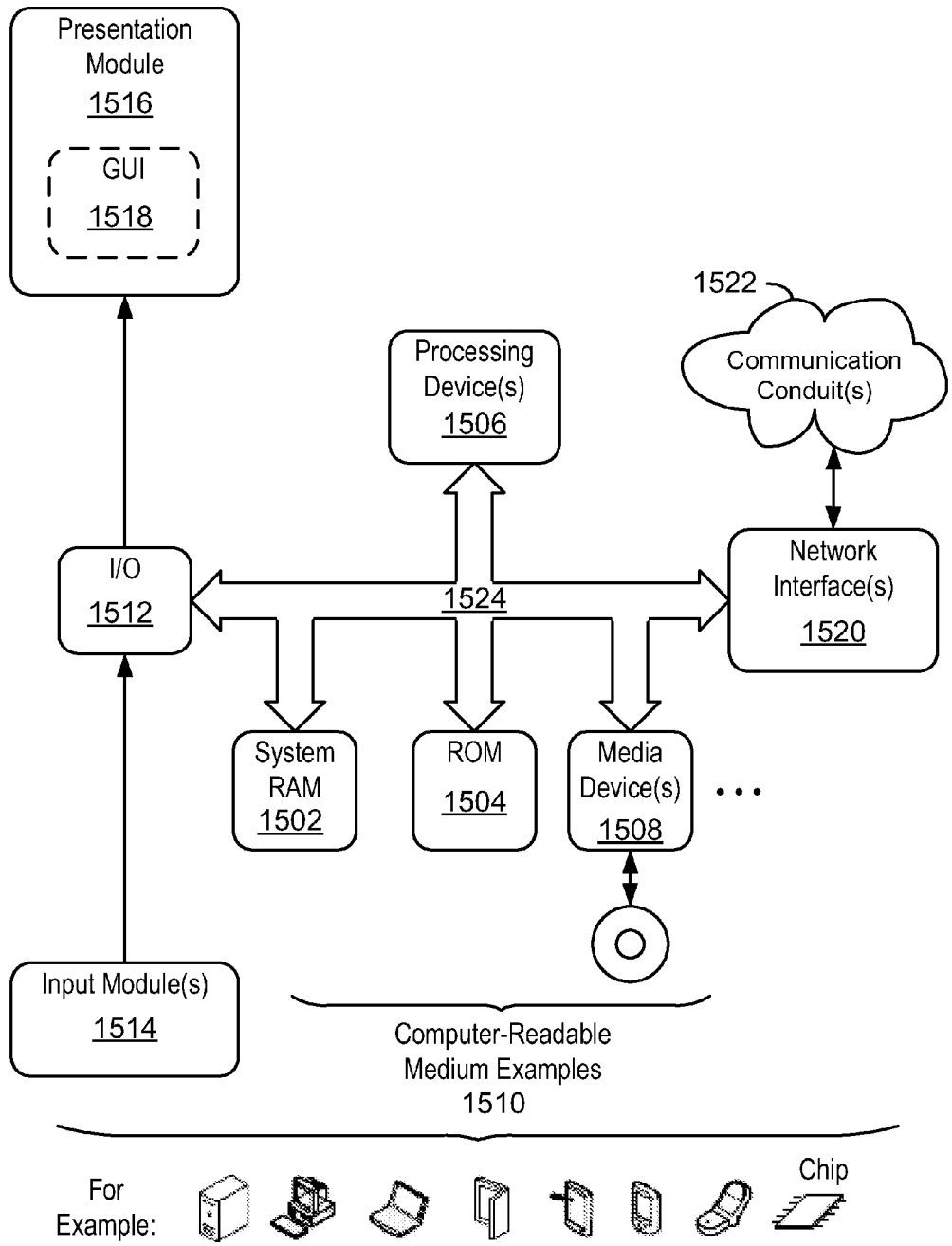
FIG. 15 shows example computing functionality that can be used to implement any aspect of the features shown in the foregoing drawings.

FIG. 15 sets forth illustrative computing functionality 1500 that can be used to implement any aspect of the functions described above. For example, the computing functionality 1500 can be used to implement any aspect of the mobile device 104. In addition, the type of computing functionality 1500 shown in FIG. 15 can be used to implement any aspect of the remote processing systems 118. In one case, the computing functionality 1500 may correspond to any type of computing device that includes one or more processing devices. In all cases, the computing functionality 1500 represents one or more physical and tangible processing mechanisms.

The computing functionality 1500 can include volatile and non-volatile memory, such as RAM 1502 and ROM 1504, as well as one or more processing devices 1506 (e.g., one or more CPUs, and/or one or more GPUs, etc.). The computing functionality 1500 also may include various media devices 1508, such as a hard disk module, an optical disk module, and so forth. The computing functionality 1500 can perform various operations identified above when the processing device(s) 1506 executes instructions that are maintained by memory (e.g., RAM 1502, ROM 1504, or elsewhere).

More generally, instructions and other information can be stored on any computer readable medium 1510, including, but not limited to, static memory storage devices, magnetic storage devices, optical storage devices, and so on. The term computer readable medium also encompasses plural storage devices. In all cases, the computer readable medium 1510 represents some form of physical and tangible entity.

The computing functionality 1500 also includes an input/output module 1512 for receiving various inputs (via input modules 1514), and for providing various outputs (via output modules). One particular output mechanism may include a presentation module 1516 and an associated graphical user interface (GUI) 1518. The computing functionality 1500 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area network, a wide area network (e.g., the Internet), etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Additionally, the functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data, such as, data-sanitizing mechanisms, encryption mechanisms, password-protection mechanisms, and so on.

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for navigating to dynamic destinations, comprising:
    associating a leader mobile device with a follower mobile device;
    displaying, on the follower mobile device, a first path from a follower vehicle, associated with the follower mobile device, to a first location of a leader vehicle, associated with the leader mobile device;
    displaying, on the follower mobile device, a second path from the follower vehicle to a second location of the leader vehicle;
    automatically determining that a traffic condition is impeding the leader vehicle;
    automatically transforming the leader mobile device to a new follower mobile device, based on the determination; and
    automatically transforming the follower mobile device to a new leader mobile device, based on the determination.

2. The method recited in claim 1, comprising:
    displaying a user selection on the leader mobile device, wherein the user selection is configured to initiate a conversation between the leader mobile device and the follower mobile device; and
    displaying the user selection on the follower mobile device.

3. The method recited in claim 2, comprising:
    displaying, on the follower mobile device, a trail associated with a map, wherein the trail represents a path from a departure location of the leader vehicle and a current location of the leader vehicle;
    displaying the trail on the follower mobile device;
    displaying the current location of the leader vehicle on the follower mobile device; and
    displaying the first path and the second path separately from the trail, wherein the first path and the second path comprise turn-by-turn directions.

4. The method recited in claim 3, comprising:
displaying the trail on the leader mobile device; and
displaying a current location of the follower on the leader mobile device.

5. The method recited in claim 1, comprising:
determining that the follower vehicle is not following the leader vehicle; and
presenting a message on the leader mobile device indicating that the follower vehicle is not following the leader vehicle.

6. The method recited in claim 1, comprising displaying an alternate path from the follower vehicle to the leader vehicle, wherein the alternate path comprises a shorter path than the first path.

7. The method recited in claim 1, comprising presenting a message, on the follower mobile device, in association with a landmark at a time when the follower vehicle is approaching the landmark, wherein the message is associated with the leader mobile device.

8. The method recited in claim 1, comprising determining an alternate route to the second path in response to determining that traffic conditions associated with the first vehicle cause a greater delay than the alternate route.

9. The method recited in claim 8, wherein determining the alternate route is based on a preference associated with the leader mobile device.

10. The method of claim 1, wherein the second path is different from a path of the leader vehicle to the second location.

11. A system for navigating to dynamic destinations, comprising:
a processing unit; and
a system memory, wherein the system memory comprises code configured to direct the processing unit to:
associate a leader mobile device with a plurality of follower mobile devices, wherein each of the mobile devices is associated with one of a plurality of follower vehicles;
determine a first path from each of the follower vehicles to a first location of a leader vehicle, wherein the leader vehicle is associated with the leader mobile device;
determine a second path from each of the follower vehicles to a second location of the leader vehicle;
automatically determine that a traffic condition is impeding the leader vehicle;
automatically transform the leader mobile device to a new follower mobile device, based on the determination; and
automatically transform the follower mobile device to a new leader mobile device, based on the determination.

12. The system recited in claim 11, comprising code configured to direct the processing unit to:
present the first path from each of the follower vehicles on each of follower mobile devices associated with each of the follower vehicles;
present the second path from each of the follower vehicles on the follower mobile devices; and
present the second path from each of the follower vehicles on the leader mobile device.

13. The system recited in claim 11, comprising code configured to direct the processing unit to:
change the leader mobile device to one of the follower mobile devices;
change another of the follower mobile devices to a new leader mobile device; and
determine, for each of the follower mobile devices, a path from each of the follower vehicles to a new leader vehicle associated with the new leader mobile device.

14. The system recited in claim 13, comprising code configured to direct the processing unit to present, on each of follower mobile devices associated with each of the follower vehicles, the path from each of the follower vehicles to the new leader vehicle.

15. The system recited in claim 11, comprising code configured to direct the processing unit to:
identify a trailing vehicle of the follower vehicles, wherein an intermediate destination is disposed between the leader vehicle and the trailing vehicle, and wherein the intermediate destination is specified by a user selection; and
determine a third path from the trailing vehicle to the intermediate destination.

16. The system recited in claim 15, comprising code configured to direct the processing unit to present the third path on a follower mobile device associated with the trailing vehicle.

17. The system recited in claim 11, comprising code configured to direct the processing unit to:
determine that one of the follower vehicles is not following the leader vehicle based on a one or more specified parameters; and
present a message on the leader mobile device indicating that the one of the follower vehicles is not following the leader vehicle.

18. The system recited in claim 11, comprising code configured to direct the processing unit to present a message, on the follower mobile devices, in association with a landmark at a time when each of the follower vehicles is approaching the landmark, wherein the message is associated with one of the follower mobile devices or the leader mobile device.

19. One or more computer-readable storage media, comprising code configured to direct a processing unit to:
associate a leader mobile device with a follower mobile device;
determine a first path from a follower vehicle, associated with the follower mobile device, to a first location of a leader vehicle, associated with the leader mobile device;
present the first path from the follower vehicle on the follower mobile device;
determine a second path from the follower vehicle to a second location of the leader vehicle;
present the second path from the follower vehicle on the follower mobile device;
automatically determine that a traffic condition is impeding the leader vehicle;
automatically transform the leader mobile device to a new follower mobile device, based on the determination; and
automatically transform the follower mobile device to a new leader mobile device, based on the determination.

* * * * *